United States Patent
Liu et al.

(10) Patent No.: US 11,289,116 B1
(45) Date of Patent: Mar. 29, 2022

(54) PATTERNED READER SHIELDS FOR A COOLER READER

(71) Applicant: Headway Technologies, Inc., Milpitas, CA (US)

(72) Inventors: Kowang Liu, Fremont, CA (US); Yuhui Tang, Milpitas, CA (US); Siu Yin Ngan, San Jose, CA (US); Qinghua Zeng, Fremont, CA (US); Ellis Cha, San Ramon, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 16/953,903

(22) Filed: Nov. 20, 2020

(51) Int. Cl.
| | |
|---|---|
| *G11B 5/40* | (2006.01) |
| *G11B 5/115* | (2006.01) |
| *G11B 5/31* | (2006.01) |
| *G11B 5/11* | (2006.01) |
| *G11B 5/60* | (2006.01) |

(52) U.S. Cl.
CPC ............. *G11B 5/115* (2013.01); *G11B 5/112* (2013.01); *G11B 5/314* (2013.01); *G11B 5/3163* (2013.01); *G11B 5/3133* (2013.01); *G11B 5/40* (2013.01); *G11B 5/607* (2013.01)

(58) Field of Classification Search
None
See application file for complete search history.

(56) References Cited

U.S. PATENT DOCUMENTS

| | | | |
|---|---|---|---|
| 7,187,520 B2 | 3/2007 | Lee et al. | |
| 7,320,168 B2* | 1/2008 | Han | G11B 5/3133 29/603.11 |
| 8,094,418 B2* | 1/2012 | Schreck | B82Y 25/00 360/317 |
| 8,817,425 B1* | 8/2014 | Wu | G11B 5/3133 360/319 |
| 10,366,715 B1 | 7/2019 | Ramaswamy | |
| 2010/0073815 A1* | 3/2010 | Aoki | G11B 5/6064 360/110 |

* cited by examiner

*Primary Examiner* — William J Klimowicz
(74) *Attorney, Agent, or Firm* — Saile Ackerman LLC; Stephen B. Ackerman

(57) ABSTRACT

A PMR, TAMR or MAMR (Perpendicular Magnetic Recording, Thermally Assisted Magnetic Recording or Microwave Assisted Magnetic Recording) slider-mounted read/write head produces less heat during operation by using magnetic read shields in which are embedded a patterned layer of thermally absorbing material. At least one shield includes a heating coil which is used to adjust the fly-height of the slider by creating a thermal protrusion at the slider ABS. When additional sources of energy, such as laser heating, microwave heating or the write coil itself, are applied to the recording medium, the shields can overheat, adversely affecting their performance. The patterned layer of heat absorbing material reduces the flow of heat from the thermal heating coil to the air bearing surface (ABS) thus cooling the region around the write head while not adversely affecting the shape of the thermal protrusion.

20 Claims, 5 Drawing Sheets

| Group | C1(POR) | C2 | C3 | C4 | C7 | C8 | C9 | C12 | C13 | |
|---|---|---|---|---|---|---|---|---|---|---|
| S1 ALD width | NA | 10 | 20 | 50 | NA | NA | NA | 20 | 50 | um |
| S2a ALD width | NA | NA | NA | NA | 8 | 16 | 36 | 16 | 36 | um |
| DFH gamma | 1.46 | 1.42 | 1.43 | 1.43 | 1.46 | 1.46 | 1.46 | 1.42 | 1.42 | |
| RTD location | S1 | S2B | S2B | S2B | S1 | S1 | S1 | S2B | S2B | |
| DFH TD TDA | 53.8 | 62.4 | 55.9 | 56.6 | 54.0 | 54.0 | 53.8 | 56.2 | 56.5 | um^-2 |
| DFH efficiency | 0.132 | 0.133 | 0.136 | 0.138 | 0.132 | 0.132 | 0.132 | 0.136 | 0.139 | nm/mW |
| Reader TR | 3.17 | 2.25 | 2.11 | 2.02 | 3.14 | 3.14 | 3.14 | 1.92 | 1.82 | degC/nm |
| Delta Reader TR | ref. | -29.1% | -33.6% | -36.3% | -1.0% | -0.9% | -1.0% | -39.4% | -42.5% | % |

FIG. 8

PATTERNED READER SHIELDS FOR A COOLER READER

1. TECHNICAL FIELD

This disclosure relates generally to thin-film magnetic read/write heads used in Perpendicular Magnetic Recording (PMR), Thermal Assisted Magnetic Recording (TAMR) and Microwave Assisted Magnetic Recording (MAMR) and particularly to methods of cooling the heads during their operation.

2. BACKGROUND

In hard-disk drive (HDD) operation of a Thermally Assisted Magnetic Recording (TAMR) device, passive flying height (height above the recording medium when read or write operations are not occurring), is greater than what occurs in unassisted Perpendicular Magnetic Recording (PMR). This is due to the operation of an extra heat source, e.g., a laser in TAMR, an rf-oscillator in microwave assisted magnetic recording (MAMR) and a spin-torque device in spin-assisted writing. The optical energy supplied by the laser or the rf energy supplied by the oscillator is intended to lower the coercivity of the magnetic recording medium during write operations, but some of the optical or rf energy is also expended more generally as undesirable heat which is not required for the read/write processes and produces greater protrusion of the read/write elements during writing and a resulting greater fly height. The PMR writer applies only a controlled amount of heat from a thermal heating element which is required to adjust the flying height of the slider-mounted read/write head. The laser-induced writer protrusion (LIWP) in TAMR depends on the Top (operational current of the laser diode) and the writer design of the head. This extra protrusion requires a higher passive flying height in order to fit the head to a media spacing (HMS) budget in TAMR. Microwave Assisted Magnetic Recording (MAMR) also provides additional heat that adds to the heat burden of the read/write head. In one form of MAMR an rf oscillator creates a precessional rotation of magnetic bits in the recording media, effectively lowering the coercivity of the media. This method produces additional heat. Another form of MAMR is called spin-assisted writing. This method does not create an rf oscillation but instead cancels the recording field of the magnetic pole inside the write gap, thereby strengthening the recording field that emerges from the ABS face of the pole. This method also produces additional heating that adds to the overall burden.

With the elevated passive flying height, the temperature rise of the reader under the same reader thermal-mechanical design is higher, causing poorer performance due to high-temperature noise and resulting reliability degradation.

SUMMARY

It is, therefore, an object of this disclosure to provide a PMR, TAMR or MAMR (in the form of either spin-torque oscillation or spin-assisted writing) read/write head whose temperature-rise during HDD operation is reduced without reducing the adequacy of the performance.

It is a further object of this disclosure to provide such a PMR, TAMR or MAMR read/write head whose temperature rise is controlled by a patterned heat-dissipating reader shield structure.

It is yet a further object of this disclosure to provide such controlled temperature rise without adversely affecting the required thermal protrusion shape (gamma) of the writer.

It is yet a further object of this disclosure to provide a controlled combination of temperature rise resulting from TAMR optical energy or MAMR microwave (rf) resonance energy and from thermal energy from heater elements.

The objects stated above will be achieved by a PMR (or TAMR or MAMR) read/write head that has at least one heating element and a patterned lower reader shield magnetically shielding its reader portion.

The heating element is formed on the lower reader shield, which has a magnetic shielding portion and a patterned thermal insulating (heat absorbing) layer. The heating element is adjacent to, but does not overlap the thermal insulating layer. The heating element is on the trailing edge (lower) face of the shield and on the side of the thermal insulator that is away from the ABS and it extends laterally and symmetrically to either side of the thermal insulating layer.

When the heating element is activated, the heat it produces flows, unabsorbed, through the portion of the magnetic shielding that lies laterally beyond the thermal insulating portion, but a remaining portion of the heat produced by the central portion of the heater is primarily absorbed by the thermal insulating portion. As a result of the selective absorption of the heat produced by the heater, the overall heating is reduced but the desired shape of the protrusion at the ABS is not severely affected.

BRIEF DESCRIPTION OF THE DRAWINGS

FIG. 8 is a table showing various simulation results for different pattern widths of the lower and upper reader shields.

DETAILED DESCRIPTION

Conventional reader shield design utilizes a one-piece shield formed of magnetic material whose shape can be changed to satisfy magnetic performance considerations. A single thermal heating element is placed on the bottom side (trailing edge side) of the shield. In dual-independent heater (DIH) operation, the first heater is generally placed underneath the reader shield structure (on its trailing edge side) and a second heater can be placed underneath the writer coil structure. We will be considering a single heater in this discussion, formed on the trailing edge side of the lower reader shield.

Figure 1:
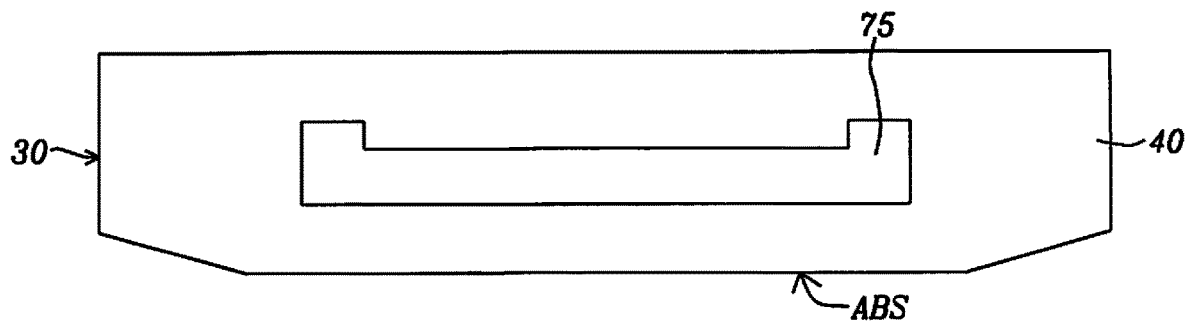
FIG. 1 is a schematic drawing of a prior art, unpatterned lower reader shield (S1) with a read heater of simple linear design formed on it.

A schematic drawing of an exemplary prior art reader shield of rectangular design 30 is shown in FIG. 1. The trailing edge side of the shield is shown, which is referred to here as the lower side. The shield is formed of low moment magnetic material 40 such as NiFe. A thermal heater 75 is formed on the prior art shield, typically in a simple linear configuration.

When the heater is energized it transmits heat through the shield material and heats the region of the slider ABS around the read/write head causing it to protrude towards the recording medium. The downtrack (direction into the plane of the figure) shape of the thermal protrusion of the ABS is called "gamma". This protrusion allows the "flying height" (height above a rotating disk) of the slider air-bearing surface (ABS) above the recording medium to be increased or decreased to facilitate the reading and writing at high area densities. This type of operation is typically called dynamic flying height (DFH) because the flying height can be adjusted during the system operation.

Figure 2:
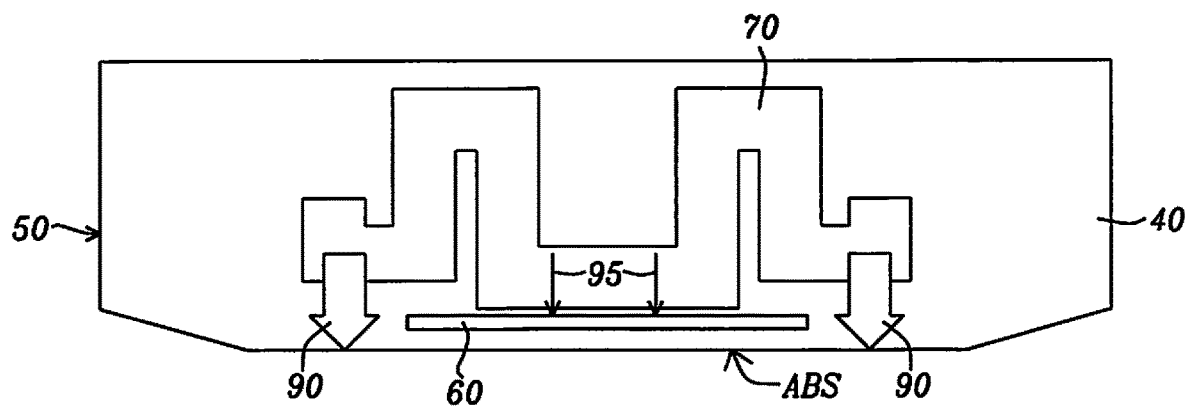
FIG. 2 is a schematic drawing of the present patterned (with a heat absorber) lower reader shield (S1) with a read heater of serpentine configuration formed on it.

Referring now to FIG. 2, there is shown, schematically, the design disclosed herein of patterning the magnetic material 40 of the present lower read shield (shield 51) 50 to include a thin, rectangularly shaped layer of thermally insulating (i.e., heat absorbing) material 60, such as alumina Al2O3 (also denoted ALD herein). This layer of insulating material 60, is formed between the heater 70, and the ABS edge of the shield and it can penetrate the entire thickness of the shield, although it will be shown partially penetrating in following FIG. 3.

The heater is formed in an exemplary symmetric serpentine configuration (although other such configurations are possible) and is separated from the surface of the shield by an electrically insulating layer (not shown). The layer of insulating material, 60, which penetrates the shield partially or completely, will block (by absorption) the direct heat flow (thin arrows) 95 from the heater 70, and prevent most of the heat from reaching the ABS of the slider. But a substantially unimpeded portion of the heat flow (large arrows 90) from both sides of the patterned heater, is allowed. The resulting lesser amount of heat flow to the ABS enables creating a desired shape of the overall read shield protrusion that will not lose too much efficiency in controlling the flying height of the slider yet will reduce the overall heat being generated.

Figure 3:
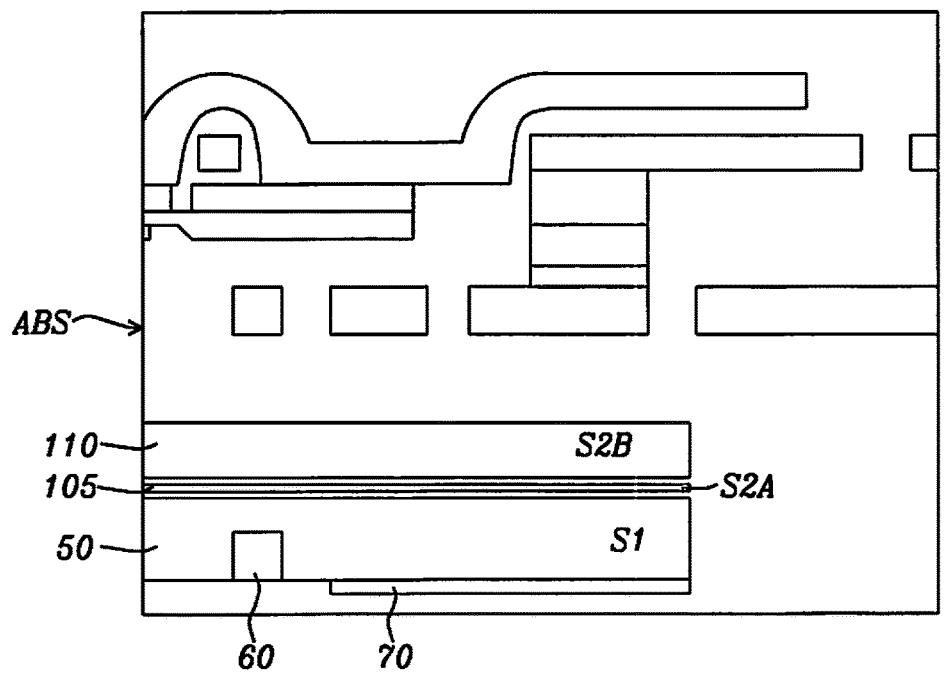
FIG. 3 is a schematic drawing of an exemplary writer structure modeled with a 2 μm thick lower reader shield (S1) and a 0.07 μm thick upper reader shield (S2A) and a shield S2B to isolate the write element from the read element.
Figure 4A:
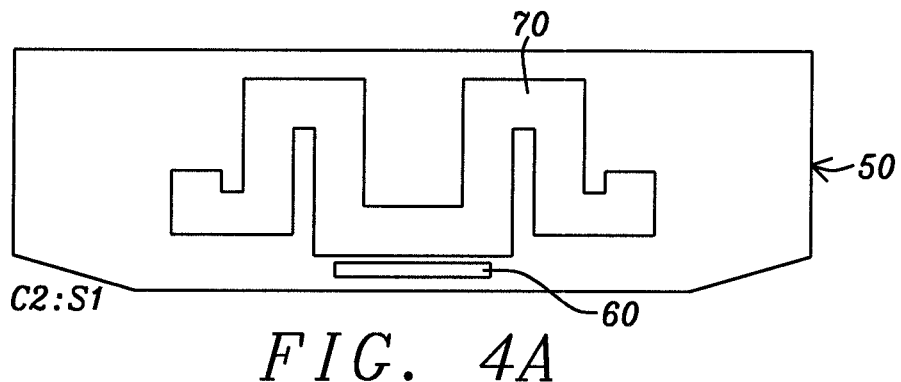
FIG. 4A-4D is a set of schematic drawings showing different pattern widths for S1 and S2A FIGS. 5, 6 and 7 schematically show the elements of the disclosed PMR head installed in an operational HDD.
Figure 4B:
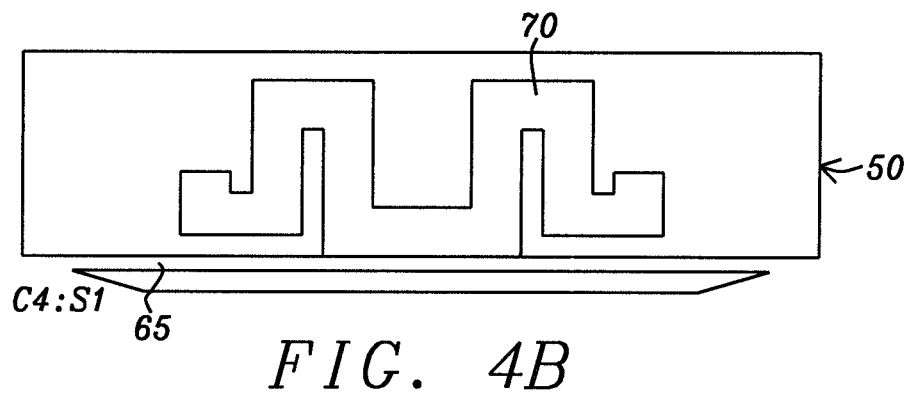
Figure 4C:
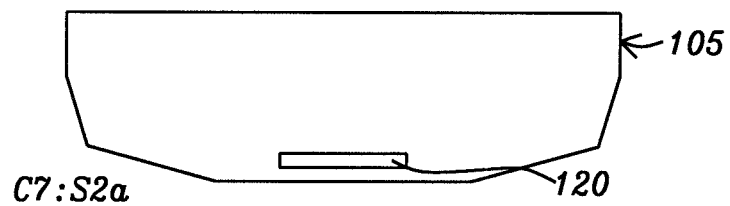
Figure 4D:
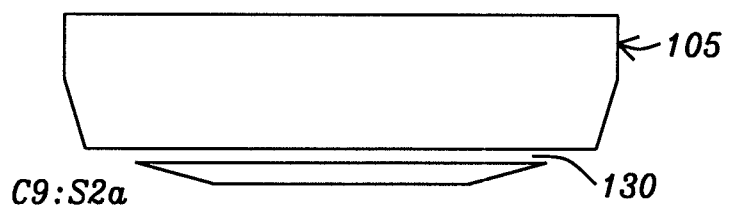

Referring to FIG. 3 there is shown schematically a side cross-sectional view from the shield (S1) 50 upward to the magnetic pole and coil structure (not relevant to the disclosure and not identified by reference numbers). The heating element 70 is shown formed on the trailing surface of shield S1 50. The heat absorbing layer 60 is shown partially penetrating (but complete penetration is possible) the thickness of S1 50. A layer of electrical insulation, both above and below the heater to isolate the heater from the shield and other electrical components is not shown. Note that the thickness of S1 50 is approximately 2 μm (and will be modeled as such) and an upper reader shield S2A 105 is approximately 0.07 μm and will also be modeled as such.

S2B 110 is a shield of magnetic material that isolates the read and write portions of the head. Its purpose is to prevent cross-talk when the head is switched between read and write operations. Although a second heater is not shown, such a heater, if desired, could be located beneath the Cu coil windings of the magnetic induction writer.

From the standpoint of fabrication methodology, the shield S1 50 can be formed by plating or by sputtering onto a dielectric layer in vacuum, depending on whether a thick (plated) or thin (sputtered) shield is desired. A photoresist pattern (not shown) can be applied to either process and can include a cavity in which the heat absorbing layer will be subsequently deposited. The heating element is first sputtered as a uniform layer onto a layer of insulation. The desired pattern is then etched using ion-beam etching. After the heater film is deposited and etched a top insulating layer is applied to isolate the heater from adjacent electrical circuitry.

The placement of the patterned thermal insulating layer 60 is critical, in that it should not overlap with the heater 70 (i.e., the heater should not be placed over the insulator). Note the space shown between the heater and the insulator In FIG. 3. If the heater has an overlay with a poor thermal conductor like alumina, the temperature of the heater will rise (for lack of dissipation into the shield) without contributing to the reader structure protrusion. In addition, if the insulator pattern 60 is directly beneath the heater 70 there will be a shorting concern between lower reader shield and the heater due to the topography between the two adjacent materials (alumina and magnetic material).

Thermal-mechanical modeling was performed using "Ansys" to quantify the effectiveness of this structure in producing required protrusion with a minimum of unnecessary heat (as is the object of the design). An example of the overall reader/writer structure (not showing any write shields) is shown in FIG. 3. The widths of the insulator pattern were varied in a matrix to confirm the tradeoff between reader temperature rise percentage and loss of the actuation efficiency, the amount of reader protrusion from initial position divided by the power needed to protrude by that amount, (see designs in FIGS. 4A-4D and Table in FIG. 8).

Referring now to the Table shown in FIG. 8 we see a series of columns labeled from C1 to C13 to identify the simulated conditions (width of the ALD thermal absorber) imposed on a bottom reader shield (S1) and an upper reader shield (denoted "S2a" in table). The rows refer to a set of simulated measurements taken with these shield configurations. We will consider the Group row to be row 1. Then:

Row 2, S1 ALD width, refers to the width of the absorber inside the bottom read shield.

Row 3, S2a, ALD width in top read shield

Row 4, DFH gamma is the ratio of heater protrusion divided by write-gap protrusion at the same heater power.

Row 5, RTD location, read-mode touchdown location.

Row 6, DFH TD TDA, dynamic flying height touchdown area.

Row 7, DFH efficiency, same as actuation efficiency.

Row 8, Reader TR, reader temperature rise.

Row 9, Delta reader TR, percentage of reader temperature rise reduction.

We will focus on the designs of those lower and upper reader shields that are illustrated in FIGS. 4A, 4B, 4C and 4D and briefly discuss the columns that represent them in FIG. 8. The paragraphs below briefly describe the two lower reader shields shown in FIGS. 4A and 4B and the two upper reader shields shown in FIGS. 4C and 4D. They differ in that 4A and 4C have heat absorbing layers 60 and 120 that do not extend the entire widths of the shields, while 4B and 4D have heat absorbing layers 65 and 130 that extend the full widths of the shields and create separate pieces of the shields.

Column C1 (referring to prior art FIG. 1) refers to the simulated effects of a prior art (POR) lower reader shield (S1) 30 and upper reader shield (S2a) (not shown in FIG. 1), neither of which have an ALD layer. Listed as (NA) in the Table.

Column C2 (referring to FIG. 4A) refers to the simulated effects of the presently disclosed design where the width (lateral extent) of the ALD layer in (S1) is 10 μm and there is no (S2a).

Column C4 (referring to FIG. 4B) refers to the simulated effects of the presently disclosed design where the ALD layer in (S1) runs the entire width of S1

Column C7 (referring to FIG. 4C) refers to a situation where there is no S1 but there is an S2a with an ALD of width 8 μm.

Column C9 (referring to FIG. 4D) refers to a situation where there is no S1, but there is an S2a with an ALD layer of width 36 μm.

The rows of the Table in FIG. 8 provide simulated numerical results for a wide range of physical properties of the shields that enable comparisons between the prior art shield of column 1 and the columns that refer to the remaining simulated situations including those shown in FIG. 4A-4D.

As expected, the larger widths of ALD in S1 can improve the heater-induced reader temperature rise (Delta Reader TR) the most. It is used here as a Figure-of-Merit (FoM), and shown in row 9. C4 shows the greatest amount, a 36.3% lower FoM, while C2 shows about a 29% FoM reduction.

The smaller and thinner piece of S2a has negligible effect on heater-induced reader temperature rise FoM. The downtrack profile "gamma" is slightly lower but it is still workable in the state-of-the-art HDD operation. The reader actuation efficiency loss is also minuscule. Overall, the patterned S1 can deliver a significant reader reduction in temperature rise in PMR, MAMR and TAMR HDDs. This is beneficial for overall reader performance and reliability. The same structures and concepts can be applied to other embodiments of PMR, MAMR and TAMR, such as use of a patterned S2B.

Figure 5:
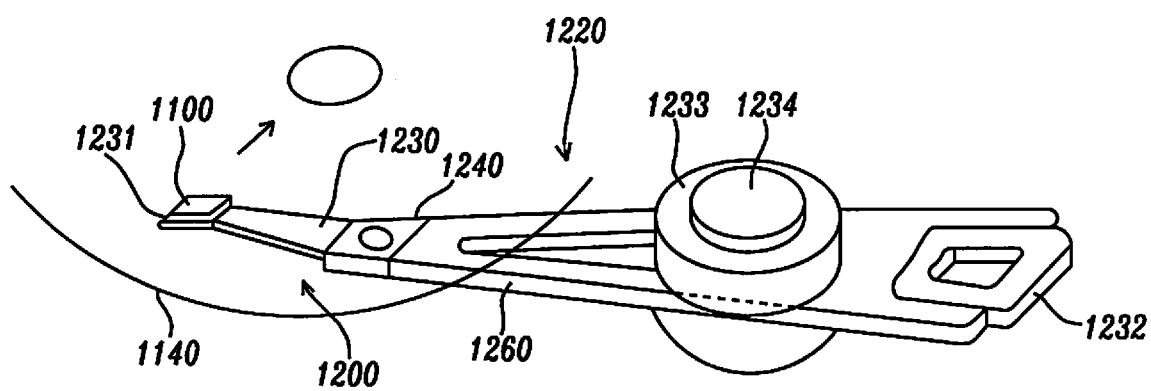
Figure 6:
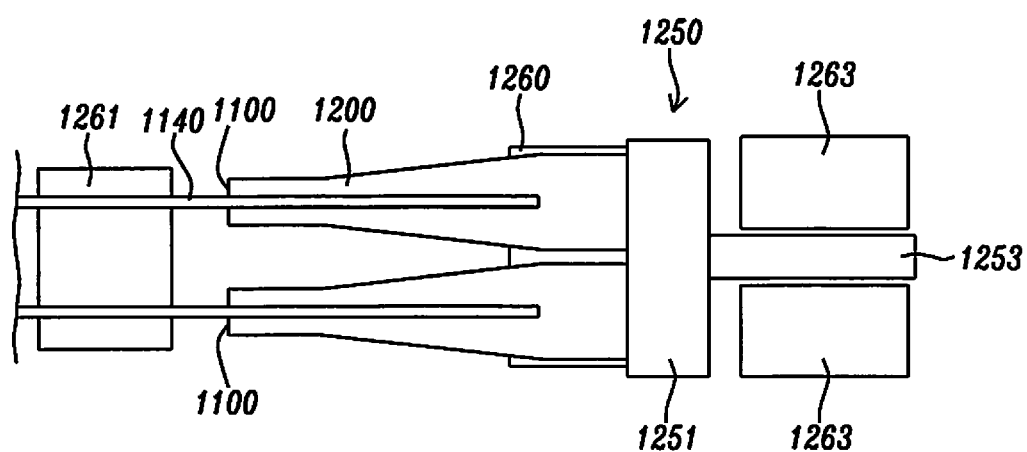
Figure 7:
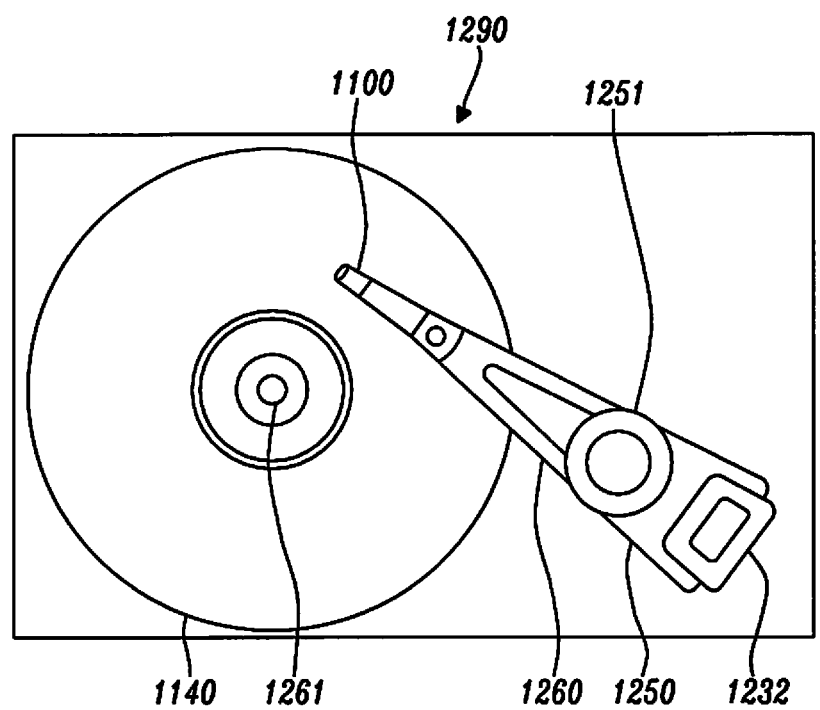

The three figures, FIGS. 5-7, show a slider-mounted PMR writer incorporating the presently disclosed reader shields with a heater and a thermally insulating heat absorbing layer as they would be mounted in an operational hard disk drive (HDD). This is to illustrate that the present shield design can be easily incorporated into the present HDD design. The figures do not show the additional apparatus associated with either a TAMR or MAMR device. The addition of apparatus to create a TAMR or MAMR device would not appreciably affect the mounting of the slider and read/write head as shown in FIGS. 5-7.

FIG. 5 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1231 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1232 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Referring next to FIG. 6 and FIG. 7, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 6 is a side view of this assembly and FIG. 7 is a plan view of the entire magnetic recording apparatus.

Referring finally to FIG. 7, the head stack assembly 1250 is shown incorporated into a magnetic recording apparatus 1290. The magnetic recording apparatus 1290 has a plurality of magnetic recording media 1140 mounted on a spindle motor 1261. Each individual recording media 1140 has two TAMR elements 1100 arranged opposite to each other across the magnetic recording media 1140 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR, TAMR or MAMR equipped with patterned reader shields for cooler operation while still forming and providing such a structure and its method of formation in accord with the spirit and scope of the present invention as defined by the appended claims.

We claim:

1. A shielded PMR read/write head with cooler operation, comprising:

a slider-mounted read/write head configured for perpendicular magnetic recording (PMR), having an air bearing surface (ABS) and comprising a reader portion and a writer portion;

a lower reader shield on a trailing edge side of said slider magnetically shielding said reader portion;

a heating element formed on a trailing edge side of said lower reader shield; and a patterned thermal insulator formed as a layer of thermally insulating material embedded in said lower reader shield, between said heating element and an ABS edge of said lower reader shield and parallel to said ABS edge of said lower reader shield, wherein said layer of thermally insulating material may extend the entire width of said lower reader shield and may be embedded the entire thickness of said lower reader shield;

wherein said heating element is formed adjacent to said layer of thermally insulating material to a side of said layer of thermally insulating material that is away from said ABS and wherein said heating element does not physically overlap said layer of thermally insulating material; wherein either said heating element extends laterally and symmetrically beyond both ends of said layer of thermally insulating material or said layer of thermally insulating material extends beyond the entire width of said heating element up to the width of said lower reader shield, whereby when said heating element extends beyond both said ends of said layer of thermally insulating material and said heating element is activated, heat produced by said heating element from portions extending laterally and symmetrically beyond either side of said layer of thermally insulating material, flows, unabsorbed by said layer of thermally insulating material through portions of said lower reader shield beyond said layer of thermally insulating material towards said ABS edge of said lower reader shield and a remaining portion of heat produced by said heating element is absorbed by said layer of thermally insulating material and does not add to the heat burden of said reader portion, whereby a thermal protrusion is produced along said ABS that satisfies required reading and writing criteria.

2. The read/write head of claim 1 wherein said layer of thermally insulating material does not extend the entire width of said magnetic shielding portion and wherein said heating element extends laterally and symmetrically beyond said layer of thermally insulating material.

3. The read/write head of claim 1 wherein said layer of thermally insulating material extends the entire width of said lower shield and is embedded completely through said shield creating two shield segments thereby and wherein said heating element does not extend laterally beyond lateral ends of said layer of thermally insulating material.

4. The read/write head of claim 1 further comprising an upper reader shield formed over a leading-edge side of said lower reader shield and comprising an ABS edge that is parallel to said ABS edge of said lower heater shield and wherein said read element is formed between said lower reader shield and said upper reader shield.

5. The read/write head of claim 4 wherein said upper reader shield also comprises a layer of thermally insulating material to impede a flow of heat to its ABS edge.

6. The read/write head of claim 4 wherein said upper reader shield comprises a layer of thermally insulating material formed parallel to said ABS edge of said upper read shield.

7. The read/write head of claim 4 wherein said upper reader shield comprises a patterned thermal insulator formed parallel to said ABS edge of said upper reader shield and extending the entire width of said upper read shield whereby said upper reader shield is divided into two sections by said patterned thermal insulator.

8. The read/write head of claim 1 wherein said heating element is formed in a symmetric serpentine configuration comprising a wide central region parallel to and adjacent to said ABS edge, two narrow regions extending rearward from ends of said central region, said narrow regions also parallel to said ABS edge but a further distance from said ABS edge and two narrow regions formed at extreme ends of said heating element, extending toward said ABS edge and thereupon becoming parallel to said ABS edge for a short distance before terminating with a slight extension away from said ABS edge.

9. The read/write head of claim 8 wherein said layer of thermally insulating material is between said wide central region and said ABS edge and extends to the left and right to lay partially between said two narrow regions and said ABS edge.

10. The read/write head of claim 8 wherein said layer of thermally insulating material is between said wide central region and said ABS edge and does not extend laterally beyond said wide central region.

11. The read/write head of claim 8 wherein said layer of thermally insulating material extends the entire width of said lower heating shield, forming a small region of said shield that contains said ABS and is separated from the portion of said shield on which said heating element is formed.

12. A head gimbal assembly, comprising
the PMR read/write head of claim 1 mounted on a slider;
a suspension that elastically supports said slider-mounted read/write head, wherein
said suspension has a flexure to which said slider-mounted read/write head is joined, a load beam with one end connected to said flexure and a base plate connected to the other end of said load beam.

13. A HDD (Hard Disk Drive), comprising:
the head gimbal assembly of claim 12;
a magnetic recording medium positioned opposite to said slider-mounted read/write head
a spindle motor that rotates and drives said magnetic recording medium;
a device that supports the slider and that positions said slider relative to said magnetic recording medium.

14. A TAMR write head comprising:
a slider-mounted read/write head configured for TAMR and comprising a reader element and a writer element and having an air bearing surface (ABS);
a TAMR apparatus for directing optical energy at a recording medium, thereby heating said recording medium in a region on which said writer element is to write;
a lower reader shield on a trailing edge side of said slider magnetically shielding said reader element;
a heating element formed on a trailing edge side of said lower reader shield; and
a patterned thermal insulator formed as a layer of thermally insulating material embedded in said lower reader shield, between said heating element and said ABS edge of said lower reader shield and parallel to said ABS edge of said lower reader shield, wherein said layer of thermally insulating material may extend the entire width of said lower reader shield and may be embedded the entire thickness of said lower reader shield;
wherein said heating element is formed adjacent to said layer of thermally insulating material to a side of said layer of thermally insulating material that is away from said ABS and wherein said heating element does not physically overlap said layer of thermal insulating material; wherein either
said heating element extends laterally and symmetrically beyond both ends of said layer of thermally insulating material or said layer of thermal insulating material extends beyond the entire width of said heating element up to the width of said lower reader shield, whereby
when said heating element extends beyond both said ends of said layer of thermally insulating material and said heating element is activated, heat produced by said heating element from portions extending laterally and symmetrically beyond either side of said layer of thermal insulating material, flows, unabsorbed by said layer of thermal insulating material, through portions of said lower reader shield beyond said layer of thermal insulating material towards said ABS edge of said lower reader shield and a remaining portion of heat produced by said heating element is absorbed by said layer of thermally insulating material and does not add to the heat burden of said reader element, whereby a thermal protrusion is produced along said ABS edge that satisfies required reading and writing criteria; and wherein heat produced by said TAMR apparatus and heat produced by said heating element remain controlled and does not add to the heat burden of said reader element and produces a thermal protrusion along said ABS edge that satisfies required reading and writing criteria.

15. The TAMR write head of claim 14 wherein said layer of thermally insulating material does not extend the entire width of said magnetic shielding portion and wherein said heating element extends laterally and symmetrically beyond said layer of thermally insulating material.

16. The TAMR write head of claim 14 wherein said layer of thermally insulating material extends the entire width of said magnetic shielding portion creating two magnetic shielding segments thereby and wherein said heating element does not extend laterally and symmetrically beyond said layer of thermally insulating material.

17. The TAMR write head of claim 14 further comprising an upper reader shield formed over a leading edge side of said lower reader shield wherein said reader element is formed between said lower reader shield and said upper reader shield and wherein said upper reader shield is divided into two sections by said patterned thermal insulator.

18. A MAMR write head comprising:
a slider-mounted read/write head configured for MAMR and comprising a reader element and a writer element and having an air bearing surface (ABS);
a MAMR apparatus for directing resonant microwave energy at a recording medium, thereby producing a precessional resonance in a magnetic recording bit thereby lowering the coercivity of said recording medium in a region on which said writer element is to write;
a lower reader shield on a trailing edge side of said slider magnetically shielding said reader element;
a heating element formed on a trailing edge side of said lower reader shield; and
a patterned thermal insulator formed as a layer of thermally insulating material embedded in said lower reader shield, between said heating element and said ABS edge of said lower reader shield and parallel to said ABS edge of said lower reader shield, wherein said layer of thermally insulating material may extend the entire width of said magnetic shielding portion and may be embedded the entire thickness of said lower reader shield;
wherein said heating element is formed adjacent to said layer of thermally insulating material to a side of said layer of thermally insulating material that is away from said ABS and wherein said heating element does not physically overlap said layer of thermally insulating material; wherein either
said heating element extends laterally and symmetrically beyond both ends of said layer of thermally insulating material or said layer of thermally insulating material extends beyond the entire width of said heating element up to the width of said lower reader shield, whereby
when said heating element extends beyond both said ends of said layer of thermally insulating material and said heating element is activated, heat produced by said heating element from portions extending laterally and symmetrically beyond either side of said layer of thermally insulating material, flows, unabsorbed by said layer of thermally insulating material, through portions of said lower reader shield beyond said layer of thermally insulating material towards said ABS edge of said lower reader shield and a remaining portion of heat produced by said heater is absorbed by said layer of thermally insulating material and does not add to the heat burden of said reader element, whereby a thermal protrusion is produced along said ABS edge that satisfies required reading and writing criteria; and wherein
heat produced by said MAMR apparatus and heat produced by said heating element remain controlled and do not add to the heat burden of said reader element and produces a thermal protrusion along said ABS edge that satisfies required reading and writing criteria.

19. The MAMR write head of claim 18 further comprising an upper reader shield formed over a leading edge side of said lower reader shield wherein said reader element is formed between said lower reader shield and said upper reader shield and wherein said upper reader shield is divided into two sections by another patterned thermal insulator.

20. A MAMR write head comprising:
a slider-mounted read/write head configured for MAMR and comprising a reader element and a writer element and having an air bearing surface (ABS);
a MAMR apparatus for spin-assisted writing, wherein magnetic flux in a write gap is eliminated by a microwave activated spin-torque device thereby allowing more flux from a magnetic pole to be directed on a recording region of a recording media, on which said writer element is to write;
a lower reader shield on a trailing edge side of a slider magnetically shielding said reader element;
a heating element formed on a trailing edge side of said lower reader shield; and
a patterned thermal insulator formed as a layer of thermally insulating material embedded in said lower reader shield, between said heating element and an ABS edge of said lower reader shield and parallel to said ABS edge of said lower reader shield, wherein said layer of thermally insulating material may extend the entire width of said lower reader shield and may be embedded the entire thickness of said lower reader shield;
wherein said heating element is formed adjacent to said layer of thermally insulating material to a side of said layer of thermally insulating material that is away from said ABS edge and wherein said heating element does not physically overlap said layer of thermally insulating material; wherein either
said heating element extends laterally and symmetrically beyond both ends of said layer of thermally insulating material or said layer of thermally insulating material extends beyond the entire width of said heating element up to the width of said lower reader shield, whereby
when said heating element extends beyond both said ends of said layer of thermally insulating material and said heating element is activated, heat produced by said heating element from portions extending laterally and symmetrically beyond either side of said layer of thermally insulating material, flows, unabsorbed by said layer of thermally insulating material, through portions of said lower reader shield beyond said layer of thermally insulating material towards said ABS edge of said lower reader shield and a remaining portion of heat produced by said heating element is absorbed by said layer of thermally insulating material and does not add to the heat burden of said reader element, whereby a thermal protrusion is produced along said ABS edge that satisfies required reading and writing criteria; and wherein
heat produced by microwave energy and heat produced by said heating element remain controlled and does not add to the heat burden of said reader element and produces a thermal protrusion along said ABS edge that satisfies required reading and writing criteria.

* * * * *